United States Patent [19]

Chamuel

[11] Patent Number: 5,031,158
[45] Date of Patent: Jul. 9, 1991

[54] METHOD AND APPARATUS FOR DRILL BIT LOCATION

[75] Inventor: Jacques R. Chamuel, Framingham, Mass.

[73] Assignee: The Charles Stark Draper Laboratory, Inc., Cambridge, Mass.

[21] Appl. No.: 592,918

[22] Filed: Mar. 23, 1984

[51] Int. Cl.⁵ .............................................. G01V 1/40
[52] U.S. Cl. ................................... 367/118; 181/106; 175/45; 367/25
[58] Field of Search ................. 181/106, 113; 175/45; 166/255; 367/140, 155, 156, 157, 168, 180; 73/151

[56] References Cited

U.S. PATENT DOCUMENTS

| 3,322,231 | 5/1967 | Gournay | 181/113 |
| 3,353,040 | 11/1967 | Abbott | 367/168 |
| 3,612,924 | 10/1971 | Semmelink | 367/168 |
| 3,734,233 | 5/1973 | Wiley | 367/156 |
| 3,739,871 | 6/1973 | Bailey . | |
| 3,828,867 | 8/1974 | Elwood | 175/45 |
| 3,876,016 | 4/1975 | Stinson | 175/45 |
| 4,003,017 | 1/1977 | Bailey | 175/45 |
| 4,144,949 | 3/1979 | Silverman | 181/106 |
| 4,283,780 | 8/1981 | Nardi | 367/180 |
| 4,460,059 | 7/1984 | Katz | 181/102 |

FOREIGN PATENT DOCUMENTS 0593169 2/1978 U.S.S.R. ............................ 181/106

OTHER PUBLICATIONS

"Magnetostriction Phenomena", Williams, W. D., general Electric Review, Mar. 1942.

Primary Examiner—Ian J. Lobo
Attorney, Agent, or Firm—Weingarten, Schurgin, Gagnebin & Hayes

[57] ABSTRACT

Method and apparatus for determining the precise location of a drill bit tip relative to specified locations on a workpiece in precision automatic machining operations. Elastic waves are induced in a drill shank, guided through the shank to the drill bit tip and couple to the surrounding workpiece material in contact with the tip of the drill bit. Elastic wave sensors are disposed in elastic wave transmitting relation with the workpiece to detect the induced elastic waves. The precise location of the drill bit tip is determined by computing the propagation time of elastic waves from the drill bit tip to each of the respective sensors. In one embodiment, elastic waves are induced with contactless electromagnetic coupling via a magnetostrictive transduction technique. Other techniques for inducing elastic waves in a drill bit are described.

27 Claims, 4 Drawing Sheets

METHOD AND APPARATUS FOR DRILL BIT LOCATION

FIELD OF THE INVENTION

This invention relates to precision machining operations and more specifically to a method and apparatus for determining the precise location of a drill bit tip relative to specified locations on a workpiece by generating and detecting elastic waves guided by the drill and coupled to the workpiece.

BACKGROUND OF THE INVENTION

In the field of automatic machining, it is often desirable to perform real time inspection of the machining operation and to terminate the operation if it appears that the machining process will not produce a part in accordance with a desired specification. By terminating machining operations prior to completion when a deviation from specification is detected, unnecessary wear of machine tools and costs associated with product waste and tie-up of manufacturing facilities and equipment are minimized. When machining some holes of small diameter, it is critical that the drill bore be true along a specified axis, and drilling diameter holes is often difficult due to stray of the drill from the desired axis. When working with small diameter drills which are flexible it would therefore be desirable to ascertain the location of the drill bit tip prior to ruining an expensive workpiece due to deviation of the bit from the specified bore axis.

Various techniques for determining the location of a drill bit are known in the geophysical arts and are employed in seismic applications. U.S. Pat. No. 3,828,867 to Elwood, teaches that a very low frequency electromagnetic transmitter may be disposed in a drill collar and sensors placed on the earth's surface around the well bore approximately in an equilateral triangle. Sensors receive very low frequency electromagnetic waves at frequencies of 5,000 hertz or below and the position of the drill bit is computed by triangulation.

None of these methods are particularly suited for precisely determining the location of a drill bit tip in a workpiece.

SUMMARY OF THE INVENTION

In accordance with the present invention a method and apparatus for precisely determining drill bit tip location are disclosed in which elastic waves are induced in the shank of a drill. Elastic waves are induced in the drill via magnetostrictive transduction (see U.S. Pat. No. 4,035,762 of same inventor and assignee) or via other suitable means. Elastic waves induced in the drill shank are guided through the shank and couple to the workpiece at the point of contact of the drill bit tip with the confronting workpiece material. Elastic wave sensors are positioned at specified locations on the workpiece and are operative to produce output signals representative of received elastic waves. The precise location of the drill bit tip is determined employing known triangulation techniques based on the propagation times of elastic waves in the drill and surrounding material. Elastic waves may also be induced in the drill shank by using electrodynamic, piezoelectric, thermoelastic, or electromagnetic methods.

In precision machining operations, it may be desirable to dispose the sensors below the workpiece or alternatively, to locate the sensors above the workpiece in elastic wave contacting relation therewith. A pressure block may be employed to urge the sensors into elastic wave transmitting contact with the workpiece.

The technique of the present invention may also be employed in geophysical or seismic applications to locate the position of a drill bit tip in a bore hole by inducing elastic waves in the earth boring tool or in a surrounding drill casing. In such applications, geophones or other suitable elastic wave sensors are disposed in the earth annularly with respect to the bore hole to receive the induced elastic waves.

BRIEF DESCRIPTION OF THE DRAWINGS

The invention will be more fully understood from the following detailed description taken in conjunction with the accompanying drawings, in which.

DETAILED DESCRIPTION OF THE INVENTION

In accordance with the present invention, a method and apparatus for determining the precise location of a drill bit in a surrounding material are disclosed. Elastic waves are induced in the shank of a drill magnetostrictively, piezoelectrically, electromagnetically, electrodynamically, or thermoelastically. Induced elastic waves are guided through the shank of the drill and coupled to the surrounding material proximate the drill bit tip. Elastic wave sensors are peripherally disposed with respect to the drill bore axis and are operative to produce output signals representative of received elastic waves. The sensor output signals are processed using known triangulation techniques to ascertain the precise location of the drill bit within the material.

Figure 1:
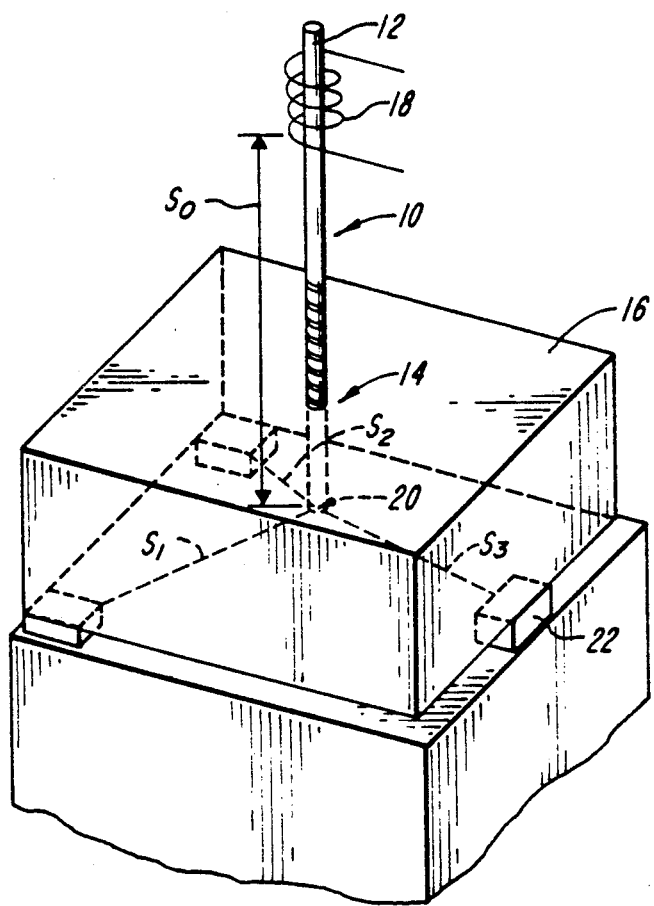
FIG. 1 illustrates apparatus for magnetostrictively inducing elastic waves in a drill and showing elastic wave sensors disposed below a workpiece.
Figure 2:
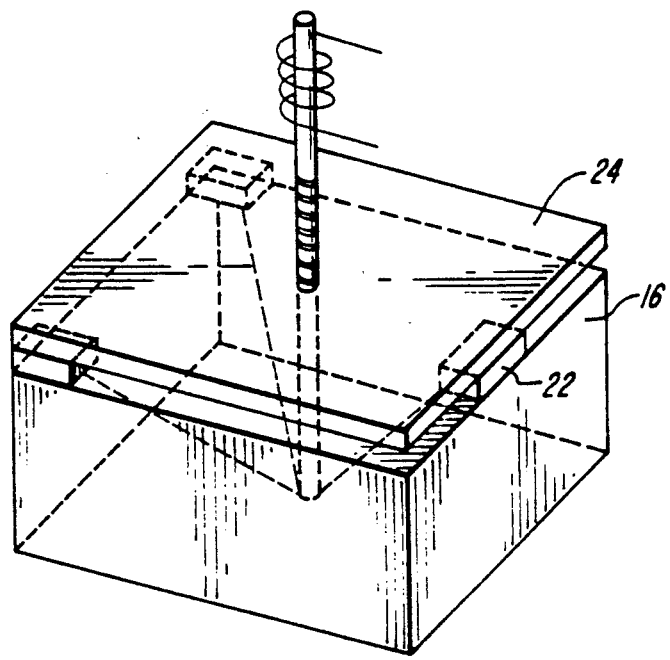
FIG. 2 illustrates apparatus for magnetostrictively inducing elastic waves in a drill and showing elastic wave sensors disposed in elastic wave transmitting contact with the upper surface of the workpiece.

FIGS. 1 and 2 illustrate embodiments of the invention adapted for precisely determining the location of a drill bit tip in a workpiece. A drill 10 having a shank 12 and a drill bit tip 14 is employed to bore a hole in a workpiece 16 along a bore axis A. In the present embodiment of the invention, the drill 10 is fabricated of a magnetostrictive material or alternatively, a portion of the shank 12 of the drill 10 is coated with a magnetostrictive material. A coil 18 is disposed around the shank 12 of the drill 10 and the coil 18 is electrically pulse energized at selected times or time intervals. The magnetostrictive interaction of the magnetic field produced by pulse energization of the coil 18 with the magnetostrictive drill 10 material, or with the drill coating of magnetostrictive material, results in magnetostrictive excitation of elastic waves in the drill 10. The induced elastic waves are guided through the shank 12 of the drill 10 and couple to the workpiece 16 adjacent the bit 14 at a point 20 corresponding to the point of contact between the drill bit tip 14 and the workpiece 16. To improve coupling of elastic waves to the workpiece 16 a fluid may be disposed in the drill 10 bore. Ultrasonic sensors 22 are peripherally disposed with respect to the drill 10 bore axis A and are precisely located in elastic wave transmitting contact with the workpiece 16. In the embodiment of FIG. 1, the ultrasonic sensors 22 are disposed beneath the workpiece 16 and the weight of the workpiece 16 urges the workpiece 16 into elastic wave coupling relation with the sensors 22. To improve elastic wave coupling of the sensors 22 to the workpiece 16 a fluid or elastomer may be disposed between the respective sensors 22 and the workpiece 16.

Figure 3:
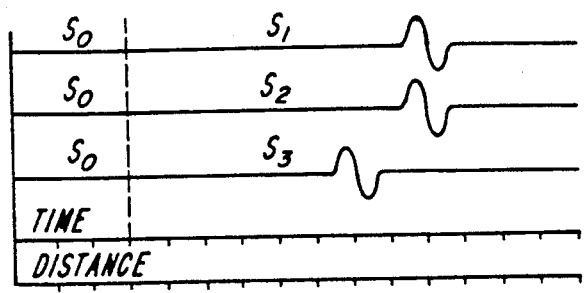
FIG. 3 is a timing diagram illustrative of signals produced by elastic wave sensors.

The induced elastic waves travel from the point 20 to the sensors 22 through the workpiece 16 at a rate corresponding to the propagation velocity of elastic waves through the workpiece 16 material. The distance between the drill bit tip 20 and the respective sensors 22 is determined in accordance with known triangulation techniques based upon the propagation velocity of elastic waves in the workpiece 16. More specifically, the time interval between pulse activation of the coil 18 and receipt of the elastic waves along paths S1, S2, and S3 at respective sensors 22 is measured as shown in the purely illustrative timing diagram of FIG. 3. The elastic wave propagation time from the coil 18 to the point 20 is determined by subtracting the elastic wave propagation time in the drill from the overall elastic wave propagation time from the time of wave inducement to the time the waves impinge each of the respective sensors 22. The distances of paths S1, S2, and S3 corresponding to the distances of respective sensors 22 to the point 20 are determined by multiplying the elastic wave propagation time in the workpiece 16 by the propagation rate of the elastic waves through the workpiece 16.

In an alternative embodiment shown in FIG. 2, sensors 22 are disposed above the workpiece 16 and a pressure plate 24 is employed to urge the sensors 22 into elastic wave coupling contact with the surface of the workpiece 16. The location of the sensors 22 with respect to the workpiece 16 is selected based upon the size and geometry of the workpiece and to provide a suitable output signal in response to induced elastic waves.

Figure 4:
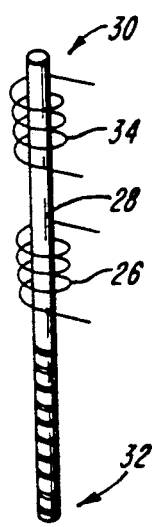
FIG. 4 is a schematic view of a drill of magnetostrictive material having two coils disposed about the shank of the drill.

In some drilling applications, inaccuracies in the determination of the drill bit tip location result as a consequence of drill bit wear, abrasion, or variations in the propagation velocity of elastic waves in the drill due to changes in drill temperature. More specifically, referring to FIGS. 1 and 3, such inaccuracies result as a consequence of the reduction in propagation time S0 in the drill due to wear of the drill bit and a corresponding reduction in drill length between the exciting coil, for example, coil 18 and the point 20 corresponding to the point of contact between the drill bit tip 14 and the workpiece 16. A method and apparatus to avoid the introduction of such inaccuracies are illustrated by the embodiment of FIG. 4. An exciting coil 26 is disposed about the shank 28 of a drill generally designated at 30. The drill 30 includes a bit having a tip 32. The drill 30 is fabricated of a magnetostrictive material or alternatively, a selected portion of the drill is coated with a magnetostrictive material. A receiving coil 34 is disposed about the shank 28 of the drill 30 at the opposing end of the drill 30 from the tip 32. The receiving coil 34 is disposed around the shank 28 of the drill 30 a fixed distance from the exciting coil 26. Upon electrical pulse energization of the exciting coil 26 a magnetic field is produced by the coil 26 which induces elastic waves in the shank 28 of the drill 30 by magnetostrictive interaction of the magnetic field with the magnetostrictive drill 30 material. The elastic waves induced in the drill 30 are guided through the shank 28 to the receiving coil 34. The receiving coil 34 is operative to produce an output signal representative of the magnetostrictive interaction of the elastic waves with the coil 34. The propagation time between electrical pulse energization of the exciting coil 26 and the detection of the signal by coil 34 is determined and the propagation velocity of elastic waves through the drill 30 is calculated by dividing the distance between the exciting coil 26 and the receiving coil 34 by the propagation time of elastic waves between coils 26 and 34. Upon electrical pulse activation of the exciting coil 26, elastic waves induced in the drill 30 are also guided toward the drill bit tip 32. Due to the acoustic mismatch between the drill 30 and the surrounding material, acoustic waves are reflected from the tip 32 back to the receiving coil 34. The propagation time is measured between pulse energization of the exciting coil 26 and generation of a signal by coil 34 representative of elastic waves reflected from the tip 32. The distance between the exciting coil 26 and the tip 32 is determined by subtracting the propagation time of the elastic wave through the drill from coil 26 to coil 34 from the propagation time for the elastic waves reflected from the tip 32 to reach coil 34. The time difference obtained after subtraction is divided by two (2) and the propagation velocity of elastic waves in the drill is employed to precisely determine the length from the exciting coil 34 to the tip 32. Inaccuracies attendant to drill wear, abrasion, or propagation velocity variations due to temperature changes, are thereby avoided. It will be appreciated that the relative locations of the exciting coil 26 and the receiving coil 34 may be reversed with appropriate modifications to the length determining algorithm necessitated by such coil reversal.

Figure 5:
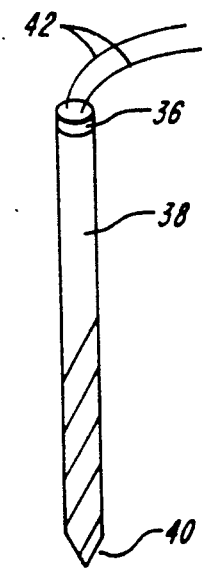
FIG. 5 is a diagrammatic view of apparatus for inducing elastic waves in a drill including a piezoelectric transducer disposed in elastic wave transmitting contact with the shank of the drill.

FIGS. 5 through 9 are illustrative of additional embodiments including means for inducing elastic waves in a drill or alternatively in a drill casing. Referring to FIG. 5, a piezoelectric transducer 36 is disposed in elastic wave transmitting contact with a drill 38. Upon electrical pulse energization of the piezoelectric transducer 36 the transducer 36 produces elastic waves. The elastic waves are coupled to the drill 38 and are guided through the drill to the drill bit tip 40. The transducer 36 may be fixably mounted to the drill 38 or alternatively elastic waves produced by the piezoelectric transducer 36 may be coupled to the drill 38 by disposing an elastic wave transmitting material between the transducer 36 and the drill 38. It will be appreciated that electrical contact via leads 42 may necessitate connection to the transducer via a commutator (not shown) to permit free rotation of the drill 38. Contactless interaction between electromagnetic fields and a piezoelectric crystal may also be employed to induce elastic waves as in surface acoustic wave devices.

Figure 6:
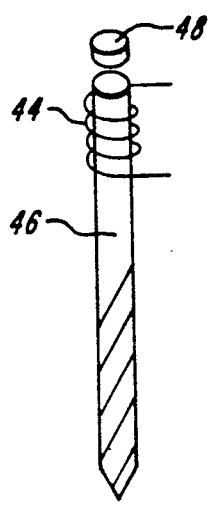
FIG. 6 is a diagrammatic view of apparatus for inducing elastic waves in a drill including a magnet disposed proximate to the drill and a coil disposed about the shank of the drill and operative to electrodynamically induce elastic waves in the drill shank upon electrical pulse energization of the coil.

FIG. 6 illustrates an embodiment adapted to electromagnetically induce elastic waves in a drill. A coil 44 is disposed around the drill 46. A magnet 48 is disposed proximate to the drill 46. The coil 44 is electrically pulse activated at selected times or time intervals to induce eddy currents in the drill 46 adjacent the coil 44. The induced eddy current interact with the magnet 48 to electromagnetically induce elastic waves in the drill 46.

Figure 7:
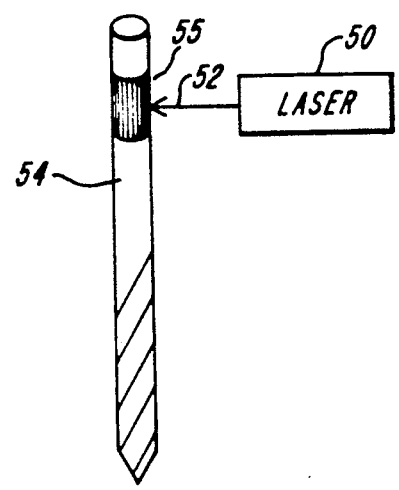
FIG. 7 is a diagrammatic view of apparatus for thermoelastically inducing elastic waves in the shank of a drill.

Another technique for inducing elastic waves in a drill is illustrated in FIG. 7. A laser 50 focuses a light beam 52 upon a region 55 of a drill 54. At selected times or time intervals the laser is activated causing pulse heating of the drill. The region 55 expands and contracts as a consequence of local heating caused by activation of the laser 50 and thereby produces elastic waves in the drill 54. The region 55 is coated to absorb the laser energy and provide maximum thermal expansion.

Figure 8:
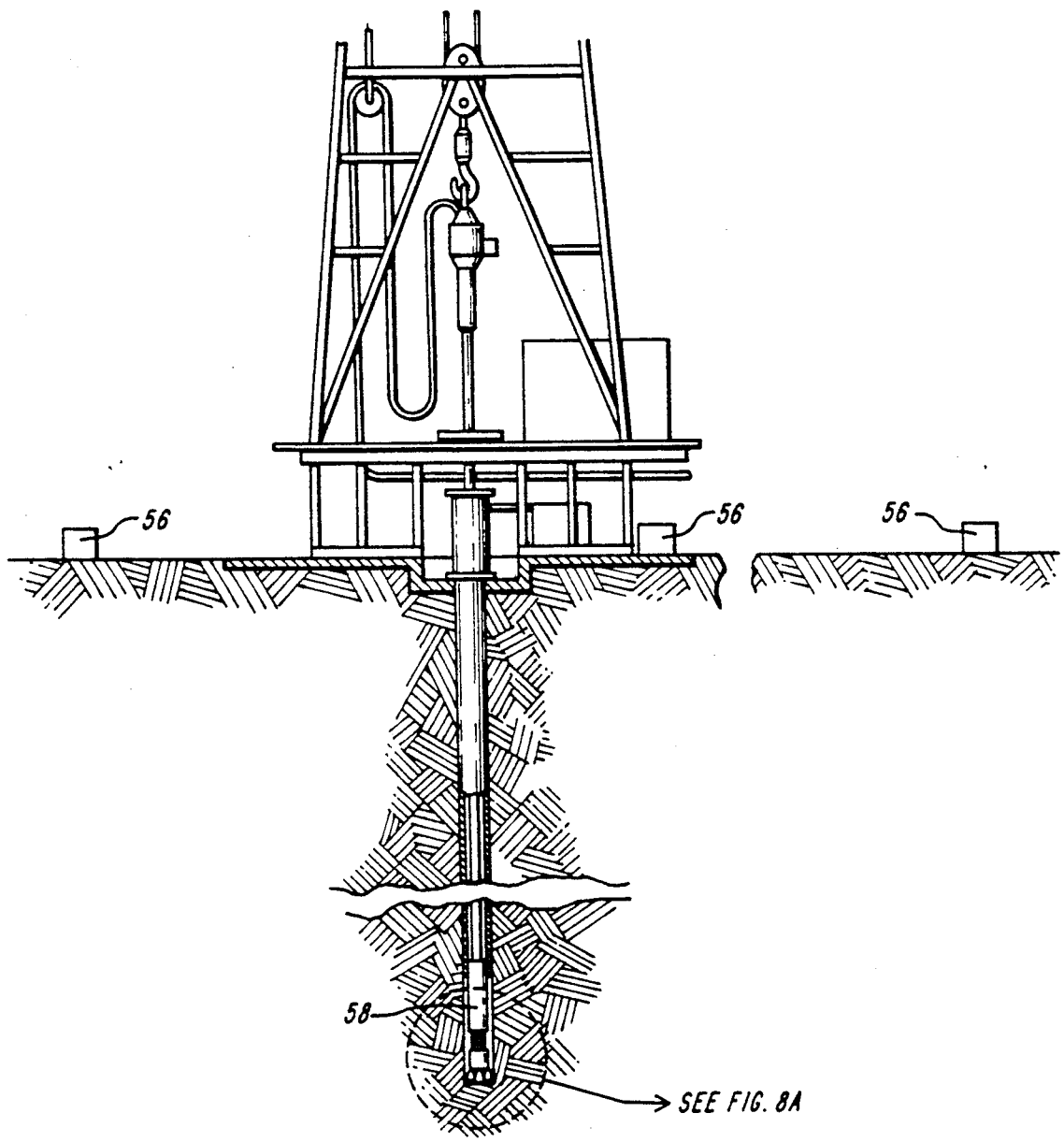
FIG. 8 is a schematic view of an earth boring apparatus including means for precisely locating the tip of the drill.
Figure 8A:
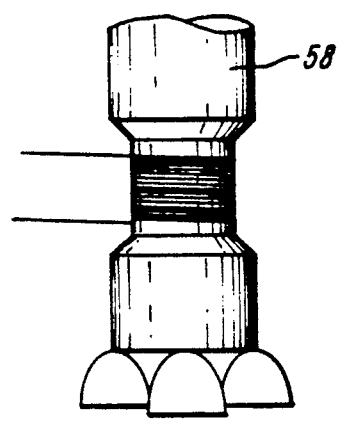
FIG. 8A is an enlarged view of the drill bit of FIG. 8.
Figure 9:
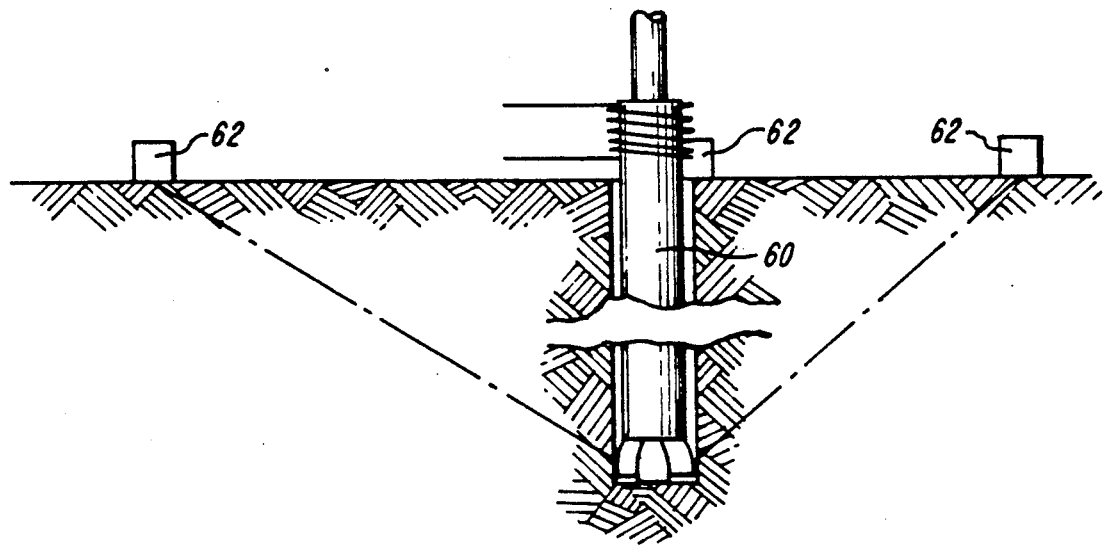
FIG. 9 is a diagrammatic view of a portion of an earth boring apparatus showing a coil disposed about a bore casing of magnetostrictive material and elastic wave sensors located on the earth's surface annularly positioned with respect to the bore axis.

As shown in FIGS. 8 and 9 the present invention may be employed to precisely locate the bit of a drill in an earth boring operation by inducing elastic waves within the drill or alternatively, by inducing elastic waves in a drill casing. Referring to FIG. 8, sensors 56 are disposed peripherally about the drill 58 bore. Elastic waves are induced in the drill 58 in accordance with any suitable technique previously set forth or via any other suitable ultrasonic technique known in the art. Induced waves travel through the drill 58 and surrounding earth to sensors 56 which produce a signal representative of the received elastic waves. Alternatively, as illustrated in FIG. 9, elastic waves may be induced in a drill casing 60 and detected by sensors 62 to precisely locate the bottom end of the casing 60. It will be appreciated that the present invention may be more suitable given certain geophysical structures and strata than others due to variations in the sound wave propagation characteristics of the material surrounding the bore axis. Low sound wave frequencies are used in the geophysics case.

In order to overcome excessive drilling noise in specific applications, elastic waves may be induced via pulse coded excitation to permit separation of induced signals from drilling noise. Although one coil is shown as an excitation coil in the present embodiments, an array or a pattern of coils may be employed to produce a spatial elastic wave pattern along an elongated member and thereby enhance the signal-to-noise ratio during sensor output signal data analysis.

It is apparent that the presently disclosed techniques may be employed to precisely determine the location of one end of a member disposed in an elastic wave transmitting material. Other embodiments, modifications, and departures from the present disclosure are possible without departing from the inventive concepts contained herein. Consequently, the invention is to be viewed as embracing each and every novel feature and novel combination of features present in or possessed by the invention herein disclosed, and is to be limited solely by the scope and spirit of the appended claims.

What is claimed is:

1. For use with an elongated member adapted for hole boring and having an end disposed in elastic wave transmitting relation with a surrounding material, apparatus for precisely determining the location of said end comprising:
    said member comprising a tool having an end adapted for cutting said surrounding material;
    means operative to induce elastic waves in said member at a location remote from said cutting end upon electrical energization of said means;
    said member itself transmitting the elastic waves from the remote location to the cutting end;
    means for coupling elastic waves induced in said member through said end to the surrounding material;
    a plurality of sensors disposed in elastic wave transmitting relation with said surrounding material, each of said sensors operative to produce an output signal representative of received elastic waves;
    means for processing the output signals from the received elastic waves.

2. The apparatus of claim 1 wherein said member includes at least a portion including magnetostrictive material and said elastic wave inducing means includes at least one exciting coil disposed about said portion operative to magneto-strictively induce elastic waves in said member upon electrical pulse energization of said coil.

3. The apparatus of claim 2 wherein said member comprises a drill of magnetostrictive material, said drill having a shank and further having a bit disposed in elastic wave transmitting relation with said surrounding material, said coil being disposed around the shank of said drill.

4. The apparatus of claim 2 wherein said member comprises a drill having at least a portion having a layer of magnetostrictive material, said coil being disposed about said portion.

5. The apparatus of claim 2 wherein said member comprises a drill casing including magnetostrictive material, said coil being disposed about said casing.

6. The apparatus of claim 1 wherein said elastic wave inducing means includes a piezoelectric transducer disposed in elastic wave transmitting relation with said member.

7. The apparatus of claim 1 wherein said elastic wave inducing means includes:
    means for generating a magnetic field in said member;
    a first coil fixably mounted to said member a selected distance from said magnetic field generating means;
    said apparatus operative to electrodynamically induce elastic waves in said member upon electrical pulse energization of said first coil.

8. The apparatus of claim 7 wherein said magnetic field generating means includes a magnet.

9. The apparatus of claim 7 wherein said magnetic field generating means includes a second coil operative to produce a magnetic field upon electrical energization of said second coil.

10. The apparatus of claim 1 wherein said elastic wave inducing means includes:
    means for generating a magnetic field in said member;
    a first coil freely disposed about said member a selected distance from said magnetic field generating means;

said apparatus, operative to electromagnetically induce elastic waves in said member upon electrical pulse energization of said coil.

11. The apparatus of claim 10 wherein said magnetic field generating means includes a magnet.

12. The apparatus of claim 10 wherein said magnetic field generating means includes a second coil operative to produce a magnetic field upon electrical energization of said second coil.

13. The apparatus of claim 1 wherein said elastic wave inducing means includes a coil fixably mounted to said member and operative to thermoelastically induce elastic waves in said member upon electrical pulse energization of said coil.

14. The apparatus of claim 2 further including means compensating for variations in the propagation time of elastic waves in the member comprising:
a receiving coil disposed about the member a specified distance from the exciting coil, said receiving coil operative to produce output signals representative of received elastic waves upon magnetostrictive interaction of said elastic waves with said receiving coil.

15. The apparatus of claim 14 wherein said receiving coil is operative to produce a first signal representative of elastic waves induced by said exciting coil and guided through said member from adjacent said exciting coil to said receiving coil and said receiving coil is operative to produce a second signal representative of elastic waves induced by said exciting coil and guided through said member so as to be reflected from said end in elastic wave transmitting contact with the surrounding material back to said receiving coil.

16. A method for determining the precise location of an end of an elongated member adapted for hole boring and disposed in elastic wave transmitting relation with a surrounding material comprising the steps of:
said member comprising a tool having an end adapted for cutting said surrounding material;
providing means for inducing elastic waves in a member at a location remote from the cutting end operative in response to electrical pulse energization of said means;
said member itself transmitting the elastic waves from the remote location to the cutting end;
inducing elastic waves in said member at least one energization time by electrical pulse energization of said elastic wave inducing means;
providing means for coupling said elastic waves from said end to the surrounding material;
disposing a plurality of sensors peripherally with respect to the member and in elastic wave transmitting relation with the surrounding material;
producing an output signal at each of the sensors representative of the time of arrival of elastic waves at the respective sensor with respect to the energization time; and
determining the location of the material contacting end of the member based upon the timing of said output signals.

17. The method of claim 16 wherein the step of providing means for inducing elastic waves includes the step of providing means for magnetostrictively inducing elastic waves in a member including magnetostrictive material by electrical pulse energization of a coil disposed about said member.

18. The method of claim 16 wherein the step of providing means for inducing elastic waves includes the step of providing means for electrodynamically inducing elastic waves in said member upon electrical pulse energization of said means.

19. The method of claim 16 wherein the step of providing means for inducing elastic waves includes the step of providing means for electromagnetically inducing elastic waves in said member upon electrical pulse energization of said means.

20. The method of claim 16 wherein the step of providing means for inducing elastic waves includes the step of providing means for thermoelastically inducing elastic waves in said member by electrical pulse energization of a coil fixably mounted to said member.

21. The method of claim 16 wherein said inducing step includes the step of inducing elastic waves in said member by electrically pulse coded energization of said elastic wave inducing means, and said producing step includes the step of producing a pulse coded output signal at respective sensors representative of said elastic waves induced by pulse coded energization of said elastic wave inducing means.

22. The method of claim 16 wherein said step of providing means for inducing elastic waves includes the step of providing at least two coils disposed about said member and operative to induce a spatial elastic wave pattern in said member upon electrical enegization of said coils.

23. The apparatus of claim 1 wherein said electrical energization consits of a pulse; and said means for processing received signals consist of time interval measurement.

24. The apparatus of claim 1 wherein said electrical energization is in the form of a burst; and said means for processing received signals consist of phase and time interval measuring circuits.

25. The method of claim 16 wherein the step of providing means for inducing elastic waves includes the step of providing means for thermoelastically inducing elastic waves in said member by laser light heating of at least one local region of said member.

26. A drilling apparatus having a drill bit disposed in an elastic wave transmitting relation with a surrounding material, comprising:
said drill bit comprising a tool having an end adapted for cutting said surrounding material;
magnetostrictive means operative to induce elastic waves at a location remote from the cutting end of said drill bit upon electrical energization of said means;
said drill bit itself transmitting the elastic waves from the remote location to the cutting end;
means for coupling said elastic waves at said end to said surrounding material;
a plurality of sensors disposed in elastic wave transmitting relation with said surrounding material, each of said sensors operative to produce an output signal representative of received elastic waves; and
means for processing the output signals from the received elastic waves.

27. The drilling apparatus of claim 26 wherein said apparatus is a precision machine tool.

* * * * *